E. J. BALCEAR, OF MARTINEZ, CALIFORNIA.

Letters Patent No. 83,820, dated November 10, 1868; antedated November 7, 1868.

IMPROVED HAIR-RESTORATIVE.

The Schedule referred to in these Letters Patent and making part of the same.

*To all whom it may concern:*

Be it known that I, E. J. BALCEAR, of Martinez, county of Contra Costa, State of California, have invented or discovered an Improved Hair-Restorative; and I do hereby declare that the ingredients used in making said hair-restorative, and the process of mixing them or compounding them to make it, with the best apparatus known to me for preparing it, are described in the following specification, with directions for using the same when compounded.

In the preparation of my hair-restorative, I use the common soap-root, (*Saponis radix*,) a plant or root indigenous to the soil of the Pacific coast, which, when stripped of its fibre, I bruise, and place in a hydraulic or other press, and express the juice therefrom, after which it may be bottled for use.

The application is made to the hair about once a week, applying a quantity sufficient to wet the hair, and penetrate to the roots, when it is thoroughly rubbed in with the hands, giving to the head the appearance as if soap-suds had been used, after which the hair is to be washed in fresh water.

The effect of the application is to remove the dandruff and scurf from the head, imparting to the hair a healthy growth, and soon restoring it to a natural color, even in old or grey-headed persons.

I do not know as it has a tendency to dye the hair, after the manner of ordinary dyes, but there may be some properties in the juice which effect a restoration of color, yet, so far as my experiments have extended, it acts as a cleansing and stimulating-fluid.

Should the root become dry, from long transportation or otherwise, after bruising, it may be soaked in a little water, and then pressed, but I prefer to extract the juice as free from water as possible, and obtain the full strength.

Having thus described my invention,

What I claim, and desire to secure by Letters Patent, is—

The within-described ingredient or root, treated and prepared in about the manner herein specified, for the purposes set forth.

In witness whereof, I have hereunto set my hand and seal.

E. J. BALCEAR. [L. S.]

Witnesses:
 J. L. BOONE,
 C. W. M. SMITH.